Nov. 11, 1969     D. H. CAMPBELL     3,477,455
SUPERSONIC INLET FOR JET ENGINES
Filed Oct. 15, 1965     2 Sheets-Sheet 1
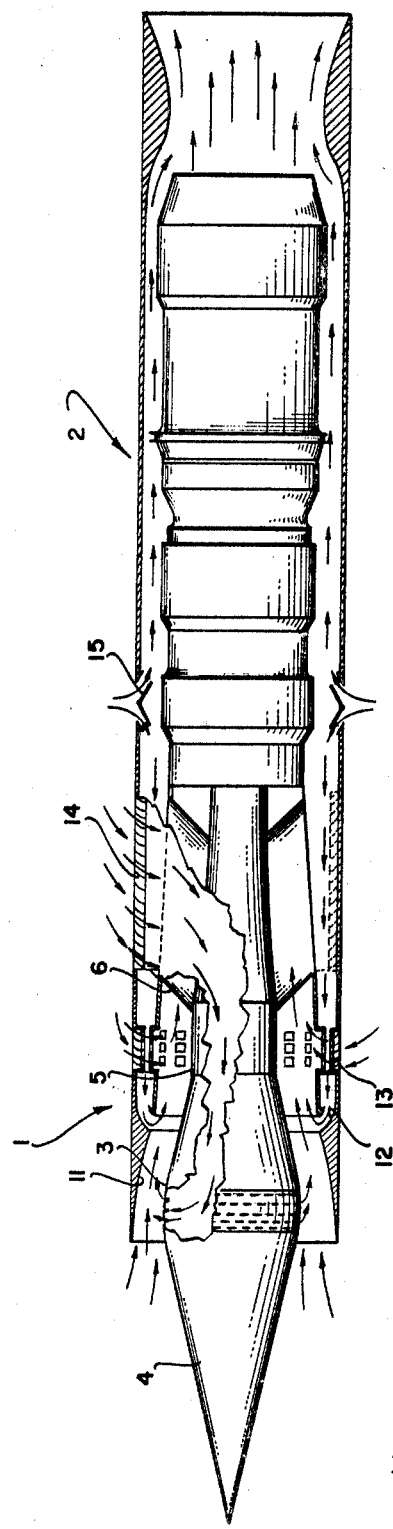
FIG._1
INVENTOR.
DAVID H. CAMPBELL
BY
*George C. Sullivan*
Agent Nov. 11, 1969   D. H. CAMPBELL   3,477,455
SUPERSONIC INLET FOR JET ENGINES
Filed Oct. 15, 1965   2 Sheets-Sheet 2
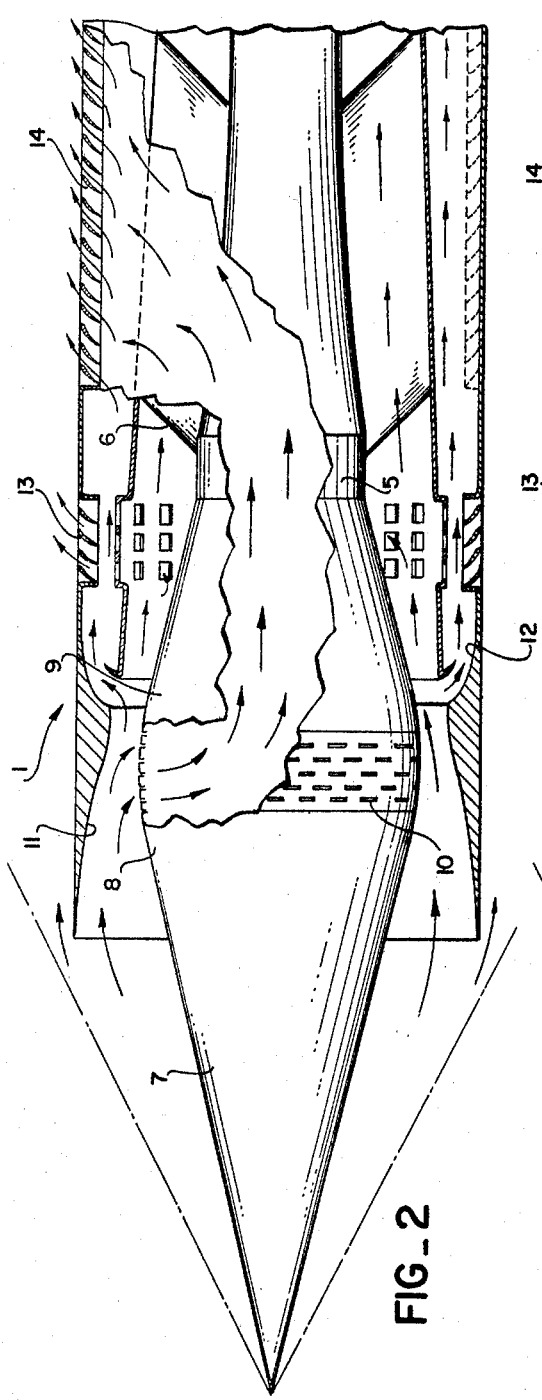
FIG_2
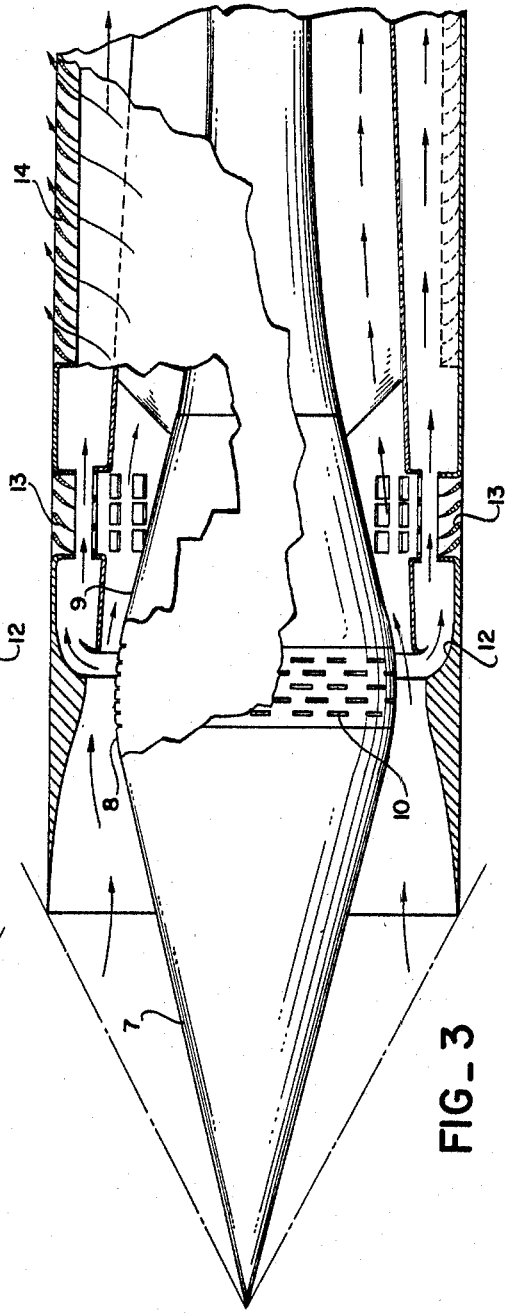
FIG_3
INVENTOR.
DAVID H. CAMPBELL
BY
*George C. Sullivan*
Agent

United States Patent Office 3,477,455
Patented Nov. 11, 1969

3,477,455
SUPERSONIC INLET FOR JET ENGINES
David H. Campbell, Van Nuys, Calif., assignor to
Lockheed Aircraft Corporation, Burbank, Calif.
Filed Oct. 15, 1965, Ser. No. 496,505
Int. Cl. F02b 27/00; B64d 33/02
U.S. Cl. 137—15.1                                    5 Claims

ABSTRACT OF THE DISCLOSURE

A supersonic inlet consisting of a translating spike and a cowl arrangement wherein the spike has a conical compression section followed by a gradual divergence to maximum diameter and then gradual convergence. The cowl forms a duct of gradually decreasing area, along a non-focusing isentropic curve to the throat and thereafter the diameter remains substantially constant. The maximum diameter of the spike is forward of the throat which contributes to a translation distance of less than one inlet radius.

---

This invention relates to an improved supersonic inlet for jet engines and more particularly to a mixed compression inlet utilizing a conical spike diffuser.

In aircraft or guided missiles which are propelled through the atmosphere by air-breathing engines at either subsonic or supersonic speeds, the free stream air should arrive at the engine combustion system with a low Mach number and with a large total pressure. In order to achieve this objective, the air intake and diffusion system must slow the air with a minimum loss of pressure. Where the air intakes are moving at supersonic speeds, the diffusion is also complicated by the formation of shock waves at the intakes.

In addition the intake configuration should have low drag characteristics and since the aircraft on which the intakes are to be employed travel from zero speeds up to and including the design speeds, the intakes should provide good engine airflow matching.

It is therefore an object of the invention to provide efficient induction of air over a speed range from zero to supersonic velocities with good engine airflow matching and low drag.

A further object of the invention is to provide a variable area inlet having high pressure recovery.

A further object of the invention is to provide a conical spike variable area inlet having a short spike translation distance.

These and other objects will become apparent from the following detailed description of a typical preferred embodiment of the invention, taken with the accompanying drawings, in which:

FIGURE 1 is a lateral view, partly in section of a jet engine with an inlet embodying the invention installed.

FIGURE 2 is a detail lateral view, partly in section of an inlet embodying the invention and showing the cone partly retracted.

FIGURE 3 is a detail lateral view similar to FIGURE 2 and illustrating the cone in the design position.

Previous attempts to provide various inlets to satisfy the requirements for high speed vehicles have utilized external compression, internal compression or various combinations of the two. With an external compression inlet the supersonic compression occurs on a surface ahead of the inlet lip. A normal shock occurs preferably close to the lip and subsonic compression takes place in a diverging diffuser inside the inlet. The compression surface can be a wedge or cone, multiple wedges or cones, or an isentropic surface, i.e., a surface which turns gradually to focus the compression shock or Mach waves outside the inlet in the vicinity of the lip.

The main problem encountered in external compression is that of proper matching of the engine airflow to the inlet, without high drag. Variable by-pass has been utilized to provide matching, but by-pass involves considerable drag and therefore is quite limited. Variable spike position to adjust the intake have been used, spilling excess air around the cowl. However, since good recovery requires a large turning angle, spilling air from the external compression surface also involves considerable drag.

An internal compression inlet may be exemplified by a converging-diverging tube, which for a certain supersonic speed has been "started" i.e. by some variation of the geometry, supersonic flow has been established in the convergent portion of the tube. The converging section reduces the supersonic speed to a velocity slightly above the local speed of sound at the throat area where a normal shock occurs and the diverging section diffuses the subsonic flow downstream of the shock. For subsonic flow into the inlet the velocities in the convergence are subsonic and increase, the maximum velocity being reached in the throat, with no shock waves. Under actual loading conditions, where the converging-diverging inlet supplies a turbine engine the back pressure and ram pressure variations react to displace the normal shock at the throat, and unless a suitably controlled by-pass is provided to relieve excess back pressure the shock moves out toward the lip and becomes detached. Such a detached shock causes a so-called bow wave and results in a reduced capture area for the stream tube corresponding to the mass flow entering the tube, and severely reduced pressure.

Most internal compression inlets have a centerbody, or else are two-dimensional with at least one movable wall to assist in controlling the area contraction ratio of the throat to the incoming stream tube which is a function of flight Mach number. The centerbody travel from minimum throat for high speeds to maximum throat for low speeds is quite large and undesirable.

The present invention utilizes a mixed compression type inlet. The translating compression surface moves forward for low flight speeds and for starting supersonic flow through the inlet. At low supersonic speeds the inlet operates as an external compression inlet with a normal shock at the cowl lip. At high supersonic speeds, the flow is compressed externally on the cone, then passes through an oblique shock from the cowl lip and is compressed internally to a Mach number slightly above 1.0 at the throat. After the throat there is a normal shock and the flow is further compressed in the subsonic diffuser.

Referring now to FIGURE 1, an inlet assembly 1 is shown attached to the forward end of a turbo jet engine 2, which may be of the standard configuration having a compressor section, combustion section, turbine, and nozzle. The inlet assembly shown in greater detail in FIGURES 2 and 3 consists of a cowl 3 and movable centerbody 4. The centerbody moves from the forward position as shown in FIGURE 1 to the aft position in FIGURE 3 on the cylindrical member 5 which is part of the supporting structure 6. It will be noted that the maximum centerbody diameter is always forward of the throat and the translation distance is less than one inlet radius. The supporting structure consists of a plurality of hollow struts having an airfoil configuration which provide an air passage for the centerbody bleed.

The centerbody or spike consists of a first section 7 which may be a low angle (about 13°) cone (3 dimension) or wedge (2 dimension) followed by a gradual divergence 8 to the maximum diameter, which is followed by a gradual converging section 9. At approximately the maximum diameter the centerbody is provided with a perforated area 10 extending circumferentially around the centerbody. The perforations provide for internal centerbody bleed which is spilled overboard through the hollow struts to provide boundary layer control required to prevent boundary layer separation.

The cowl 3 is provided with an internal compression area 11, which is preferably isentropic and non-focusing and extends from the lip to the throat. Behind or downstream of the throat the internal cowl diameter may remain substantially the same, or may decrease up to about 5% per unit of length, depending upon the subsonic diffusion required and to maintain a maximum total pressure recovery. Cowl bleed 12 removes a portion of the incoming air and supplies it through the annular passage around the propulsion plant for engine cooling purposes. The cowl is further provided with by-pass doors 13 which control the shock position and overboard spillage respectively as hereinafter explained. Suck-in doors 15 may be provided in the rear cowl surface to control additional air at low speeds and on the ground and static operations.

Centerbody or spike translation is illustrated in different positions in FIGURES 1, 2 and 3. For a static aircraft, reference is made to FIGURE 1, wherein the centerbody is full forward. At this time, there is no ram effect and the by-pass doors 13 and suck-in doors 15 are open to allow additional air to be drawn in by the engine compressors. Also the suction effect past the centerbody perforation pulls in air through the centerbody overboard bleed 14.

As the velocity of the aircraft increases to approximately but below Mach 1, ram effect becomes significant and the by-pass doors and suck-in doors are closed. The cowl bleed 12 and centerbody bleed are operating normally. The centerbody or spike remains in the full forward position. Below the sonic speed (Mach 1) there is no shock wave and subsonic diffusion takes place. It is to be noted that for subsonic speeds the spike is forward and the inlet is essentially constant area followed by a divergent diffusion section. Therefore, for subsonic velocities the inlet provides a resulting decrease in velocity at an increased pressure to the intakes of the engine.

However, for velocities above the sonic speed, i.e., supersonic velocities, a shock wave is formed on the apex of the cone (or wedge), and for a particular cone angle, as illustrated, the shock angle varies as a function of the Mach number. At low supersonic velocities the oblique shock angle from the cone is large and the normal shock is positioned at the cowl lip. Since the velocities down stream of the normal shock are subsonic, the spike is forward and the normal subsonic diffusion takes place.

As the aircraft speed increases further toward the design speed, the oblique shock angle becomes smaller until at the design speed the shock intercepts the cowl lip. At intermediate supersonic speeds the normal shock is swallowed and moves toward the throat with diminishing intensity. As shown in FIGURE 2, the spike is retracted to establish an optimum throat area and to obtain the desired external compression on the cone and internal compression on the inner cowl surface. The by-pass doors 13 are now opened as required to maintain the normal or terminal shock at the throat.

FIGURE 3 shows the inlet at the design speed with the spike fully retracted with the normal or terminal shock positioned in the throat. The by-pass doors 13 at the design speed are normally closed on a standard day and are opened as required to position the shock or restart the inlet. Also for restarting, the spike is translated forward to reduce the internal contraction allowing the normal shock to be swallowed and the diffuser is "started," i.e., the flow in the converging portion up to the shock is supersonic.

A suitable control is required to accurately position the spike as a function of Mach number and attitude, and to position the by-pass doors as a function of shock position as indicated by pressure measurements. The control may be of any conventional type but is preferably of the type illustrated in U.S. Patent No. 2,920,446.

While a specific embodiment of the invention has been shown and described it should be understood that certain alterations, modifications and substitutions may be made to the instant disclosure without departing from the spirit and scope of the invention as defined by the appended claims.

I claim:
1. A variable area inlet for jet engines operating over the range from subsonic to supersonic velocities comprising the combination of a fixed three dimensional cowl and a movable centerbody together defining for supersonic velocities an external compression area followed by an internal isentropic compression to the throat and a normal shock at the throat which is followed by a subsonic diffuser, and for subsonic velocities the cowl and centerbody defining a substantially constant area section followed by a divergent subsonic diffuser, said centerbody having a low angle cone section followed by a gradual divergence to the maximum diameter and then a gradual convergence, said cowl having an inner surface characterized by an isentropic non-focusing area from the cowl lip to the throat and a substantially constant diameter thereafter, and by-pass means for positioning the shock at the cowl lip for low supersonic velocities and at the throat for velocities approaching the design speed.

2. An inlet as defined by claim 1, wherein the centerbody includes perforations adjacent the maximum diameter thereof, and duct means connected between said perforations and the surface of said cowl for bleeding a portion of the capture flow to the exterior of the cowl.

3. In combination with a jet engine, an inlet comprising a fixed cowl and movable centerbody, said cowl extending forward from the engine housing and terminating at the forward end in an annular lip, the interior surface of said cowl forming a duct of gradually decreasing area from said lip following an isentropic non-focusing curve to a minimum diameter at the inlet throat, the internal diameter remaining substantially constant the remainder of its length, said centerbody having a first low angle conical section followed by a gradual divergent section to a maximum diameter and which is followed by a gradual convergent section, said centerbody being movable from a supersonic design position wherein the maximum diameter is ahead of the inlet throat to a low speed position wherein the centerbody is moved to its full forward position up stream, a translation of less than one inlet radius, and the isentropic cowl surface and convergent centerbody surfaces are adjacent and form a substantially constant cross-section area.

4. The combination defined in claim 3, further including cowl bleed means located adjacent said throat area for removing a portion of the air intake for engine cooling.

5. The combination of claim 4, and further including by-pass means in said cowl downstream of said throat area for controlling the position of the normal shock.

References Cited

UNITED STATES PATENTS

| 3,054,255 | 9/1962 | Stratford | 137—15.1 |
| 3,172,622 | 3/1965 | Kalika | 60—270 X |
| 3,242,671 | 3/1966 | Moorhead | 137—15.1 |

ALAN COHAN, Primary Examiner